US012567022B2

(12) United States Patent (10) Patent No.: US 12,567,022 B2

Singh et al. (45) Date of Patent: Mar. 3, 2026

---

(54) SYSTEM AND METHOD FOR CONTEXTUAL TRACKING OF LABEL UNITS AND OPTIMIZING ENERGY CONSUMPTION THEREOF

(71) Applicant: JIO PLATFORMS LIMITED, Ahmedabad (IN)

(72) Inventors: Gulprit Singh, Bengaluru (IN); Vishal Shashikant Patil, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 102 days.

(21) Appl. No.: 18/477,908

(22) Filed: Sep. 29, 2023

(65) Prior Publication Data

US 2024/0112128 A1 Apr. 4, 2024

(30) Foreign Application Priority Data

Sep. 29, 2022 (IN) .............................. 202221055977

(51) Int. Cl.
G06Q 10/083 (2024.01)
G06Q 10/0833 (2023.01)

(52) U.S. Cl.
CPC ... G06Q 10/08355 (2013.01); G06Q 10/0833 (2013.01)

(58) Field of Classification Search
CPC .................... G06Q 10/08355; G06Q 10/0833
See application file for complete search history.

(56) References Cited

U.S. PATENT DOCUMENTS

| | | | | |
|---|---|---|---|---|
| 2021/0256472 A1* | 8/2021 | Javidan | .............. | G06Q 10/0833 |
| 2022/0051182 A1* | 2/2022 | Fox | ...................... | G08B 25/008 |
| 2022/0147922 A1* | 5/2022 | Cawse | ................... | H04W 4/38 |
| 2023/0379691 A1* | 11/2023 | Dhiman | ................. | H04W 4/12 |
| 2023/0394421 A1* | 12/2023 | Edgren | ............. | G06Q 10/0833 |
| 2024/0428090 A1* | 12/2024 | Hashimoto | ............ | G08B 25/04 |

OTHER PUBLICATIONS

Arif Abdul Aziz, Battery-Less Location Tracking for Internet of Things: Simultaneous Wireless Power Transfer and Positioning, 2019, p. 9147-9148 (Year: 2019).*

* cited by examiner

*Primary Examiner* — Ibrahim N El-Bathy

(74) *Attorney, Agent, or Firm* — FINNEGAN, HENDERSON, FARABOW, GARRETT & DUNNER, LLP

(57) ABSTRACT

The present disclosure provides a system (100) and a method for contextual tracking of label units (110) and optimizing energy consumption thereof. The system (100) includes one or more label units (110) being attached to a corresponding object (106), each label unit (110) having one or more sensors (116) that collect one or more tracking data, and being powered by a corresponding power supply unit (118). A tracking system (102) receives the tracking data from each of the label units (110) via a first set of signals, and determines a state-of-charge value of the power supply unit (118) therewith. When the state-of-charge value is less than a transit duration value associated with the object (106), the tracking system (102) determines one or more contextual transit parameters, and transmits a second set of signals to the label units (110) to optimize energy consumption thereof based on the contextual transit parameters.

12 Claims, 5 Drawing Sheets

100

200

TRACKING SYSTEM
102

| PROCESSOR(S) 202 | MEMORY 204 | INTERFACE(S) 206 |

PROCESSING ENGINE
208

TRACKING ENGINE
212

VALUE DETERMINATION ENGINE
214

CONTEXT DETERMINATION ENGINE
216

OTHER ENGINE(S)
218

DATABASE
210

400

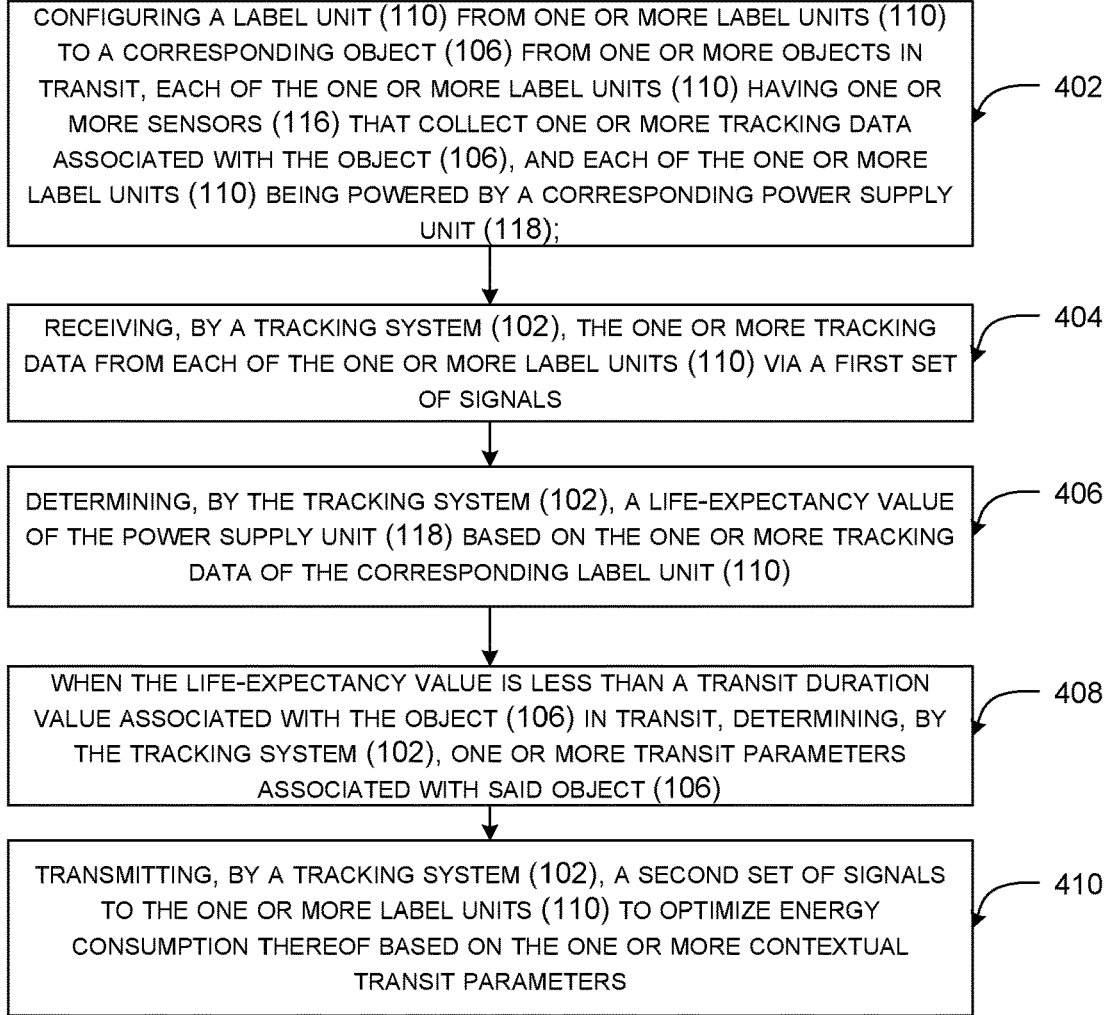

CONFIGURING A LABEL UNIT (110) FROM ONE OR MORE LABEL UNITS (110) TO A CORRESPONDING OBJECT (106) FROM ONE OR MORE OBJECTS IN TRANSIT, EACH OF THE ONE OR MORE LABEL UNITS (110) HAVING ONE OR MORE SENSORS (116) THAT COLLECT ONE OR MORE TRACKING DATA ASSOCIATED WITH THE OBJECT (106), AND EACH OF THE ONE OR MORE LABEL UNITS (110) BEING POWERED BY A CORRESPONDING POWER SUPPLY UNIT (118);    402

RECEIVING, BY A TRACKING SYSTEM (102), THE ONE OR MORE TRACKING DATA FROM EACH OF THE ONE OR MORE LABEL UNITS (110) VIA A FIRST SET OF SIGNALS    404

DETERMINING, BY THE TRACKING SYSTEM (102), A LIFE-EXPECTANCY VALUE OF THE POWER SUPPLY UNIT (118) BASED ON THE ONE OR MORE TRACKING DATA OF THE CORRESPONDING LABEL UNIT (110)    406

WHEN THE LIFE-EXPECTANCY VALUE IS LESS THAN A TRANSIT DURATION VALUE ASSOCIATED WITH THE OBJECT (106) IN TRANSIT, DETERMINING, BY THE TRACKING SYSTEM (102), ONE OR MORE TRANSIT PARAMETERS ASSOCIATED WITH SAID OBJECT (106)    408

TRANSMITTING, BY A TRACKING SYSTEM (102), A SECOND SET OF SIGNALS TO THE ONE OR MORE LABEL UNITS (110) TO OPTIMIZE ENERGY CONSUMPTION THEREOF BASED ON THE ONE OR MORE CONTEXTUAL TRANSIT PARAMETERS    410

FIG. 4

SYSTEM AND METHOD FOR CONTEXTUAL TRACKING OF LABEL UNITS AND OPTIMIZING ENERGY CONSUMPTION THEREOF

RESERVATION OF RIGHTS

A portion of the disclosure of this patent document contains material, which is subject to intellectual property rights such as but are not limited to, copyright, design, trademark, integrated circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The present disclosure relates to a tracking fleet and cargo with label units, and more particularly, to a method and a system for contextual tracking of label units and optimizing energy consumption thereof.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With the introduction of Internet of Things (IoT) technology, world is moving towards technological advancement across all fields. One such field is the cargo and fleet management. IoT devices or labels in market today come with monitoring and tracking capabilities. These IoT devices are attached to the objects or artefacts in transit for tracking and monitoring. Once these devices are associated to a package and activated, they communicate with cloud network for tracking and monitoring purpose.

Many IoT devices are equipped with batteries to allow them to provide power to sensors and monitoring units therein, and communicate with external tracking systems. While IoT device may have a plurality of shapes and form-factors, they are limited by size constraints posed by the goods or products they are attached to. Such size constraints, among other issues, limit the size and capacity of batteries that can be used to power the IoT devices. It is desirable to have smaller and lower capacity batteries since IoT devices are often designed to be compact and light weight.

In some situations, batteries may run out of power before the goods or products associated therewith are shipped from source location to destination location. Due to difficulties in recharging the batteries in transit, tracking systems may become incapable of tracking such IoT devices, thereby losing tracking data during the remainder of the transit. While some existing solutions may try to forecast or impute the tracking data based on the data collected before the battery was drained, there is a dearth of solutions that do so with acceptable accuracy and reliability. Additionally, such solutions do not factor contextual information of the IoT devices when the battery drains. Furthermore, existing tracking systems do not recommend optimized use of batteries of the IoT devices based on the contextual information.

There is, therefore, a need in the art to provide a system and a method for contextual tracking of label units and optimizing energy consumption thereof.

OBJECTS OF THE PRESENT DISCLOSURE

Some of the objects of the present disclosure, which at least one embodiment herein satisfies are as listed herein below.

An object of the present disclosure is to provide a system and a method for contextual tracking of label units and optimizing energy consumption thereof.

Another object of the present disclosure is to provide a system and a method for tracking label units based on contextual information including, but not limited to, destination location, transit duration, power discharge trend, cloud feedback on power discharge trends, re-routing or route deviation, etc. along with remaining charge of power supply units.

Another object of the present disclosure is to provide a system and a method for optimizing energy consumption of label units to extend capacity of power supply units thereof.

Another object of the present disclosure is to provide a system and a method for tracking packages from source to destination irrespective of the distance and duration, and provide seamless package tracking experience to customer(s).

Another object of the present disclosure is to provide a system and a method that allows for accurate end-to-end tracking of packages using the label units without any kind of technical hinderance.

Another object of the present disclosure is to provide a system and a method for tracking label units that is simple, cost effective, and consumes less power, thereby being environmentally friendly.

SUMMARY

The present disclosure relates to a tracking fleet and cargo with label units, and more particularly, to a method and a system for contextual tracking of label units and optimizing energy consumption thereof.

In an aspect, a system for contextual tracking of label units and optimizing energy consumption thereof. The system may include one or more label units with each label unit being attached to a corresponding object from one or more objects in transit. Each of the one or more label units may have one or more sensors that collect one or more tracking data associated with the object. Each of the one or more label units may be powered by a corresponding power supply unit. The system includes a tracking system having one or more processors coupled to a memory, said memory may have one or more processor-executable instructions. Execution of the processor-executable instructions may cause the one or more processors to receive the one or more tracking data from each of the one or more label units via a first set of signals, and determine a state-of-charge value of the power supply unit based on the one or more tracking data of the corresponding label unit. the one or more processors may determine one or more contextual transit parameters associated with said object based on the state-of-charge value being less than a transit duration value associated with the object in transit, and transmit a second set of signals to the one or more label units to optimize the energy consumption thereof based on the one or more contextual transit parameters.

In an embodiment, the one or more contextual transit parameters may be any one or combination of including, but not limited to, a route type parameter, a transit type parameter, an object type parameter, a consignor and consignee parameter, and the one or more tracking data of the one or more label units sharing a transit container.

In an embodiment, to optimize the energy consumption of the one or more label units, the one or more processors may determine an alternate transit route for the object based on the one or more contextual transit parameters and the state-of-charge of the power supply unit.

In an embodiment, in response to receiving the second set of signals, the one or more label units may conserve energy by any one or combination of including, but not limited to, reducing ping frequency of communication between said one or more label units and the tracking system, optimizing frequency at which the one or more sensors collect the one or more tracking data, periodically entering into sleep mode, and dynamically adjusting one or more performance configurations of the one or more label units to conserve the energy.

In an embodiment, the object in transit may be associated with a transit container having an intermediate communication unit, when the transit duration value is greater than the state-of-charge value of the power supply unit, the one or more label units may be configured to transmit the one or more tracking data to the tracking system via the intermediate communication unit, thereby reducing energy consumption thereof.

In an embodiment, when a first state-of-charge value associated with a first label unit from the one or more label units is less than the transit duration value of the object associated therewith, the first label unit may be configured to transmit a third set of signals to the tracking system for replacing said first label unit with a second label unit having a second state-of-charge value greater than the transit duration value.

In an embodiment, each of the one or more label unit may include an audio-visual unit to provide any one or combination of audio and visual indications to an operator of the system for replacing the first label unit attached to the object with the second label unit.

In an embodiment, the first label unit may include a subscriber identifier attribute indicative of a Mobile Station International Subscriber Directory Number (MSISDN) number associated with a Subscriber Identity Module (SIM) thereof. The subscriber identifier attribute may be transferred from the first label unit to the second label unit on replacement.

In an embodiment, each of the one or more label units may include a communication unit for transmitting to and receiving data from the tracking system, and a conductive strip with which said label unit is secured to the corresponding object. The conductive strip may have a connector interface that enables communication with other label units and transmit a fourth set of signals therebetween.

In an aspect, a method for contextual tracking of label units and optimizing energy consumption thereof. The method may include configuring a label unit from one or more label units to a corresponding object from one or more objects in transit, each of the one or more label units having one or more sensors that collect one or more tracking data associated with the object. Each of the one or more label units may be powered by a corresponding power supply unit. The method includes receiving, by a tracking system, the one or more tracking data from each of the one or more label units via a first set of signals. The method may include determining, by the tracking system, a state-of-charge value of the power supply unit based on the one or more tracking data of the corresponding label unit. Further, the method may include determining, by the tracking system, one or more contextual transit parameters associated with said object based on the state-of-charge value being less than a transit duration value associated with the object in transit. The method may further include transmitting, by a tracking system, a second set of signals to the one or more label units to optimize energy consumption thereof based on the one or more contextual transit parameters.

In an aspect, a user equipment may include one or more processors, and a memory operatively coupled to the one or more processors, where the memory may include processor-executable instructions, which on execution, cause the one or more processors to transmit a fifth set of signals to a tracking system requesting one or more tracking data of an object in transit collected by a label unit attached thereto, where the label unit optimizes energy consumption based on a state-of-charge value of a power supply unit thereof, and a transit duration value determined using one or more contextual transit parameters. The user equipment may receive a sixth set of signals from the tracking system, said sixth set of signals having the requested one or more tracking data.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 4 illustrates a flowchart of an example method (400) for contextual tracking of label units (110) and optimizing energy consumption thereof, in accordance with an embodiment of the present disclosure.

Figure 1:
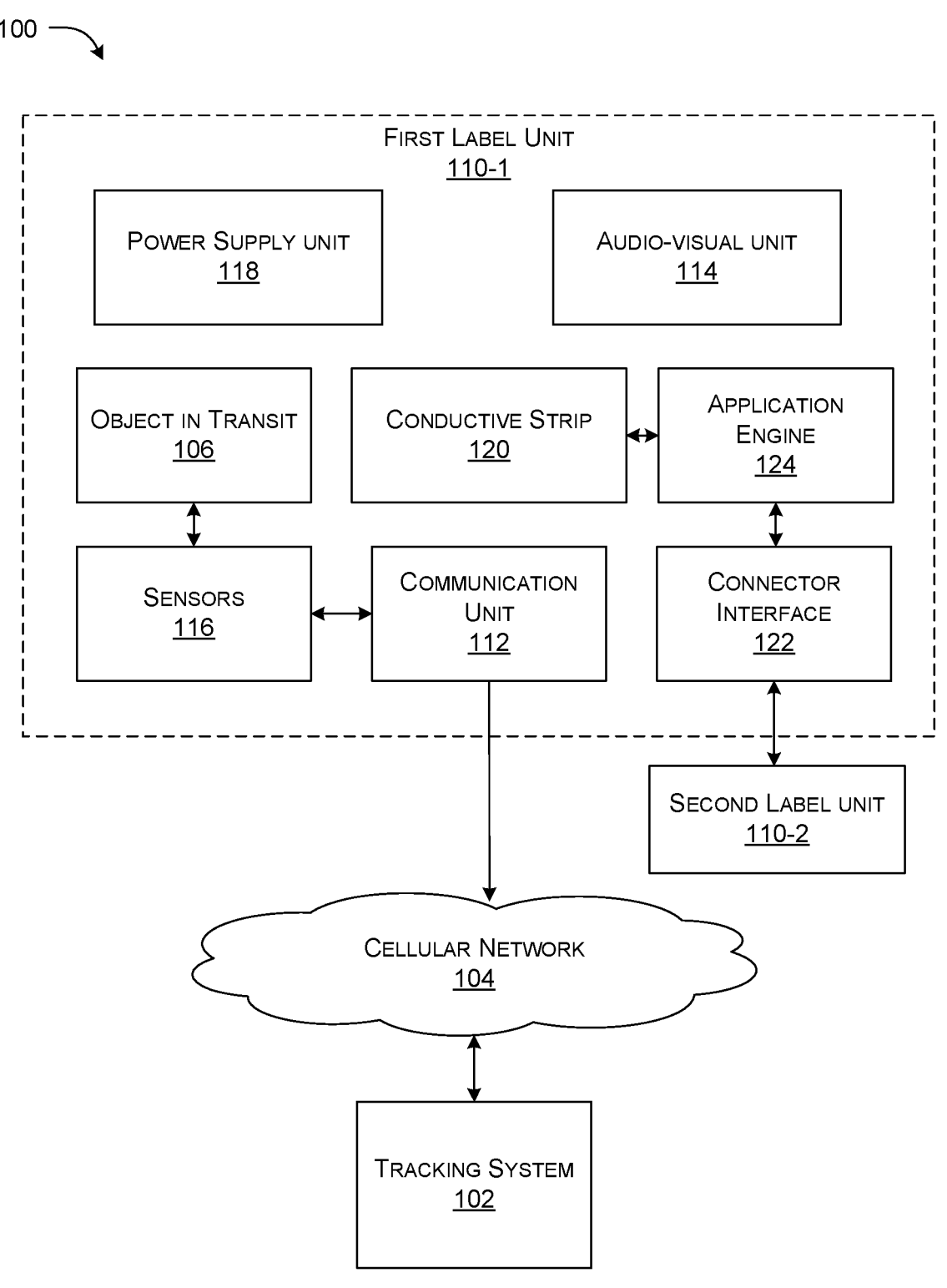
FIG. 1 illustrates an exemplary architecture in which or with which a proposed system (100) may be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present disclosure provides a system and a method for contextual tracking of label units and optimizing energy consumption thereof. In an aspect, the system may include one or more label units with each label unit being attached to a corresponding object from one or more objects in transit. Each of the one or more label units may have one or more sensors that collect one or more tracking data associated with the object. Each of the label units may be powered by a corresponding power supply unit. The system may include a tracking system having one or more processors coupled to a memory, said memory may have one or more processor-executable instructions. Execution of the processor-executable instructions may cause the one or more processors to receive the one or more tracking data from each of the one or more label units via a first set of signals, and determine a state-of-charge value of the power supply unit based on the one or more tracking data of the corresponding label unit. When the state-of-charge value is less than a transit duration value associated with the object in transit, the one or more processors may determine one or more contextual transit parameters associated with said object, and transmit a second set of signals to the one or more label units to optimize energy consumption thereof based on the one or more contextual transit parameters.

The various embodiments throughout the disclosure will be explained in more detail with reference to FIGS. 1-5. The embodiments in the forthcoming figures are described in the context of cargo and fleet management. Particularly, the forthcoming disclosures are described in its applications in tracking and monitoring one or more objects in transit with contextual tracking of smart label devices, and optimizing energy consumption thereof.

FIG. 1 illustrates an exemplary system architecture of the proposed system (100), in accordance with an embodiment of the present disclosure.

As illustrated, in an embodiment, the proposed system (100) may include a tracking system (102). In an embodiment, the tracking system (102) may include one or more input devices, one or more output devices, one or more power devices, and one or more communication engines operatively coupled to the tracking system (102). In an exemplary embodiment, the one or more output devices may include a display unit, an audio unit, and the like, but not limited to the same.

In an embodiment, the tracking system (102) may be communicatively coupled with one or more label units (110). The one or more label unit (110) may be an Internet of Things (IoT) device, but not limited to the same. Each label unit (110) may be attached to a corresponding object (106) from one or more objects in transit. In an embodiment, the one or more objects (106) in transit may be indicative of any products, packages, or goods shipped between two geographically separated locations. In an example, the one or more objects (106) in transit may be a hardware appliance being shipped from a seller in a first geographical region to a customer in a second geographical region. In an embodiment, each of the one or more objects (106) in transit may be configured with a corresponding label unit (110) for collection of one or more tracking data.

In an embodiment, each of the one or more label units (110) may have one or more sensors (116) that collect one or more tracking data associated with the object (106). The one or more sensors (116) may include, but not be limited to, accelerometers, compasses, gyroscopes, Global Positioning System (GPS), altimeters, image sensors, temperature sensors, humidity sensors, optical sensors, pneumatic sensors, gas sensors, chemical or biological contaminant sensors, and the like. In an embodiment, the one or more sensors (116) may be configured to read sensor data from an external networked sensor that is in proximity with the one or more label units (110), over a Bluetooth or wireless fidelity (Wi-Fi) network. The one or more tracking data may include, but not be limited to, capacity of a power supply unit (118) and remaining charge therein, discharge trend of the power supply unit (118), source and destination location of the object (106), transit duration, transit route, re-routing or route deviation if any, network condition and climate condition prediction during the transit, total number of functioning sensors and frequency thereof, health, orientation, temperature, live shipping status, and the like. The label unit (110) may include a storage unit (not shown) for storing the one or more tracking data collected by the one or more sensors (116).

In an embodiment, the one or more label units (110) may include the power supply unit (118) indicative of including, but not limited to, electrical power supply, one or more batteries, voltaic cells, thermoelectric generators, piezoelectric generators, and the like. The power supply unit (118) may provide power to the one or more sensors (116), and other components associated with the label unit (110) as described in the present disclosure. In an embodiment, at least one of the one or more sensors (116) may collect tracking data including, but not limited to, capacity of the power supply unit (118) during installation, power discharge trend, current level of charge in the power supply unit (118), and the like. In an embodiment, the power supply unit (118)

may have a state-of-charge value associated therewith. The state-of-charge value may be indicative of the length of time for which the power supply unit (118) may provide power to the label unit (110). In some examples, the power supply unit (118) may be indicative of a rechargeable battery.

In an embodiment, each of the one or more label units (110) may include a communication unit (112) for transmitting to and receiving data from the tracking system (102). In an embodiment, the communication unit (112) may be associated with a connector interface (122) via which a first label unit (110-1) from the one or more label units (110) may communicate with a second label unit (110-2) from said one or more label units (110).

Figure 3:
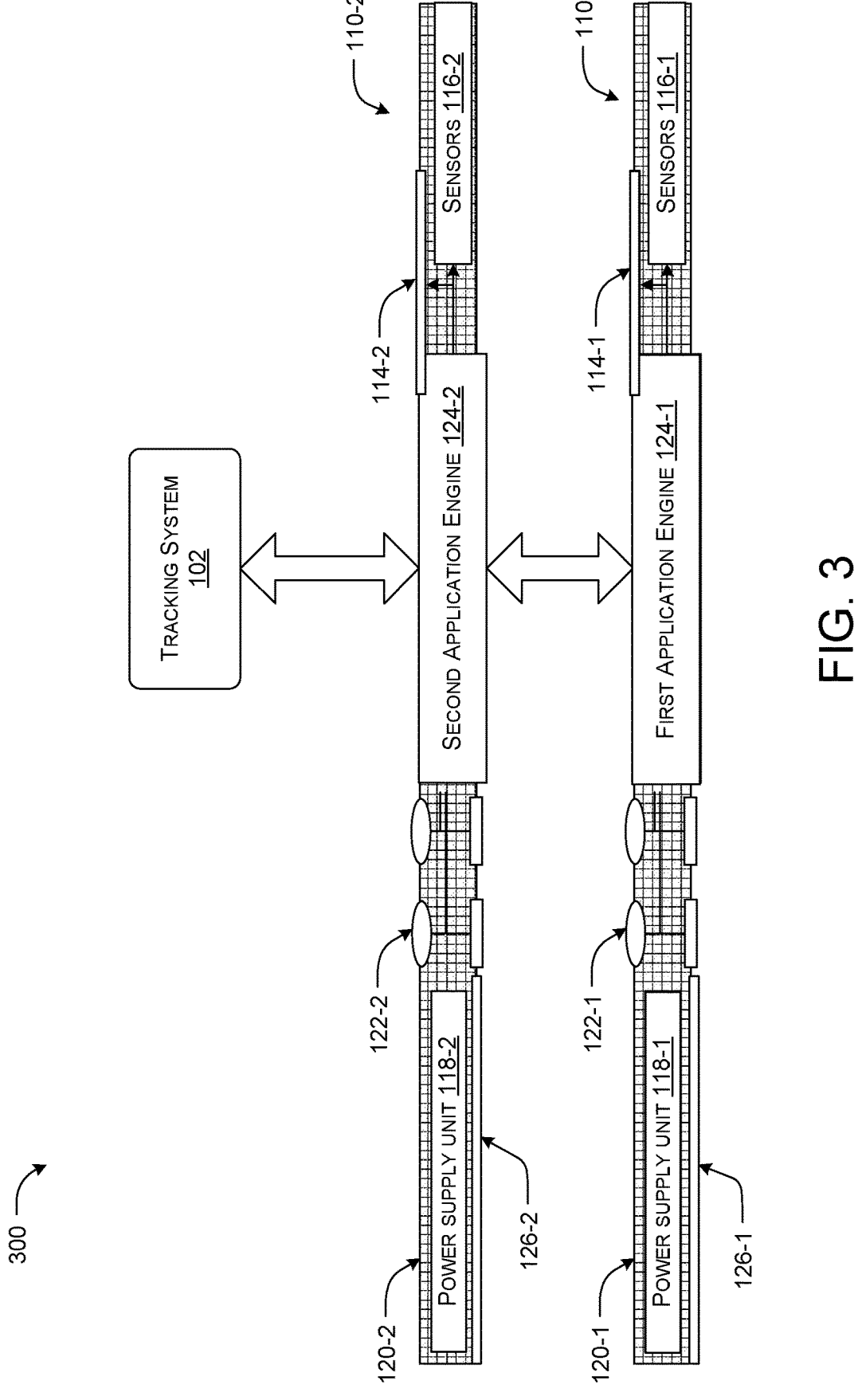
FIG. 3 illustrates an exemplary representation (300) of conductive strips (120) associated with a first label unit (110-1) and a second label unit (110-2), in accordance with an embodiment of the present disclosure.

In an embodiment, the label units (110) may include a conductive strip (120) with which said label unit (110) may be secured to the corresponding object (106). In an embodiment, the conductive strip (120) may include an adhesive portion (126) (as shown in FIG. 3) that may be used to securely configure the label units (110) to the objects (106) in transit. In an embodiment, the conductive strip (120) may cover the label units (110).

In an embodiment, the conductive strip (120) may have the connector interface (122) that enables communication with other label units (110) and transmit a fourth set of signals therebetween. The conductive strip (120) may communicate with the one or more sensors (116). In some embodiments, the conductive strip (120) may be configured to detect conditions including, but not limited to, damage or tear caused to the one or more label units (110). In such embodiments, the first label unit (110-1) that is damaged may be replaced with the second label unit (110-1). In other embodiments, the first label unit (110-1) secured to the object (106) may be replaced by the second label unit (110-2) when a first power supply unit (118-1) of the first label unit (110-1) has a state-of-charge value insufficient for providing power through the duration of transit. When the first label unit (110-1) is replaced by the second label unit (110-1), the connector interfaces (122-1, 122-2) (as shown in FIG. 3) may establish a 2-way encrypted communication channel therebetween to transmit a fourth set of signals for indicating the need for replacement.

In an embodiment, when a first state-of-charge value associated with the first label unit (110-1) from the one or more label units (110) is less than the transit duration value of the object (106) associated therewith, the first label unit (110-1) may transmit a third set of signals to the tracking system (102) for replacing said first label unit (110-1) with the second label unit (110-2) having a second state-of-charge value that may be greater than the transit duration value. In an example, the first label unit (110-1) may be attached to the object (106). A transit duration value may be determined for the object (106) based on shipping arrangements made therefor. If the transit duration value is determined to be greater than the state-of-charge value of the power supply unit (118), the first label unit (110-1) may transmit the third set of signals to the tracking system (102), indicative a need for replacing the first label unit (110-1) with the second label unit (110-2). The second label unit (110-2), in such examples, may have a power supply unit (118) with state-of-charge greater than the transit duration. Replacing the first label unit (110-1) with the second label unit (110-2) may allow the object (106) to be tracked throughout the transit, without risk of interruptions due to discharge of the power supply unit (118).

In an embodiment, the one or more label units (110) may include an audio-visual unit (114) to provide any one or combination of audio and visual indications for replacing the first label unit (110-1) attached to the object (106) with the second label unit (110-2) to an operator of the system (100). In an embodiment, the audio-visual unit (114) may display instructions for replacing said label units (110). In an embodiment, the instructions for replacement may be displayed on the audio-visual unit (114) when the third set of signals may be transmitted to the tracking system (102).

In an embodiment, each label unit (110) may have a corresponding subscriber identifier attribute. In an embodiment, the subscriber identifier attribute may be indicative of a Mobile Station International Subscriber Directory Number (MSISDN) number associated with a Subscriber Identity Module (SIM) of the corresponding label unit (110). In an embodiment, the SIM of the label units (110) may be indicative of a physical SIM, an Integrated Subscriber Identity Module (iSIM), an e-SIM, and the like, but not limited thereof. The SIM may allow for communication with other label units (110) or the tracking system (102). In an embodiment, each of the label units (110) may also include a set of unique identifier attributes associated thereto. In an embodiment, the set of unique identifier attributes of the label units (110) may be indicative of any one or combination of an International Mobile Equipment Identifier (IMEI) number, an Integrated Circuit Card Identification Number (ICCIN), and an International Mobile Subscriber Identity (IMSI) associated with the corresponding label unit (110).

In an embodiment, the subscriber identifier attribute may be transferred from the first label unit (110-1) to the second label unit (110-2) on replacement. In some embodiments, subscriber identifier attribute may be transferred by transmitting a seventh set of signals to the tracking system (102) which initiates said transfer. In other embodiments, the first label unit (110-1) may use an application engine (124) associated therewith to transfer the subscriber identifier attribute to the second label unit (110-2), via the fourth set of signals. The transfer of the subscriber identifier attribute may be initiated either by the first label unit (110-1) or the tracking system (102) when the transit duration value is determined to be greater than the state-of-charge value of the power supply unit (118) of the first label unit (110-1) whereafter said first label unit (110-1) may be replaced by the second label unit (110-2).

In an embodiment, the one or more label units (110) may have the application engine (124) configured to execute one or more processor-executable instructions. In an embodiment, on replacement, a first application engine (124-1) associated with the first label unit (110-1) and a second application engine (124-2) of the second label unit (110-2) may establish a 2-way encrypted communication channel therebetween via corresponding connector interfaces (122-1, 122-2) (as shown in FIG. 3). The first application engine (124-1) may be configured to transmit the subscriber identifier attribute to the second application engine (124-2), and the second label unit (110-2) may be configured to use the subscriber identifier attribute transmitted thereto to communicate with the tracking system (102) via a network, e.g. a cellular network (104).

In an embodiment, the tracking system (102) may be communicatively coupled with the one or more label units (110) via the network (104). In an embodiment, the network (104) may be a wireless communication network including, but not limited to, a Second Generation (2G), a Third Generation (3G), a Fourth Generation (4G), a Fifth Generation (5G), a Sixth Generation (6G), a Long-Term Evolution (LTE) network, a New Radio (NR), a Narrow-Band (NB), an IoT network, a Global System for Mobile Communications (GSM) network and a Universal Mobile Telecommunications System (UMTS) network, combinations thereof, and the like. In other embodiments, the tracking system (102) may be suitably adapted to communicate with the label units (110) when the network (104) may be indicative of any one or combination of a Bluetooth, a Zigbee, a Near Field Communication (NFC), a Wi-Fi network, a Light Fidelity (Li-FI) network, a carrier network including a circuit-switched network, a packet switched network, a Public Switched Telephone Network (PSTN), a Content Delivery Network (CDN) network, an Internet, intranets, Local Area Networks (LANs), Wide Area Networks (WANs), and the like. In an exemplary embodiment, the network (104) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (104) may include, by way of example but not limitation, one or more of: a wireless network, a wired network, an internet, an intranet, a public network, a private network, an ad hoc network, an infrastructure network, a cable network, a cellular network, a satellite network, a fiber optic network, some combination thereof.

In an embodiment, the tracking system (102) may be implemented in a computing device. In an embodiment, computing device may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, servers including, but not limited to, a stand-alone server, a remote server, a cloud computing server, a dedicated server, a rack server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, and the like. The computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. In an example, the keypad may be configured to acquire one or more attributes of the entity or object or packaging details and other state parameters associated with the object (106). It may be appreciated that the computing device may not be restricted to the mentioned devices and various other devices may be used.

Figure 2:
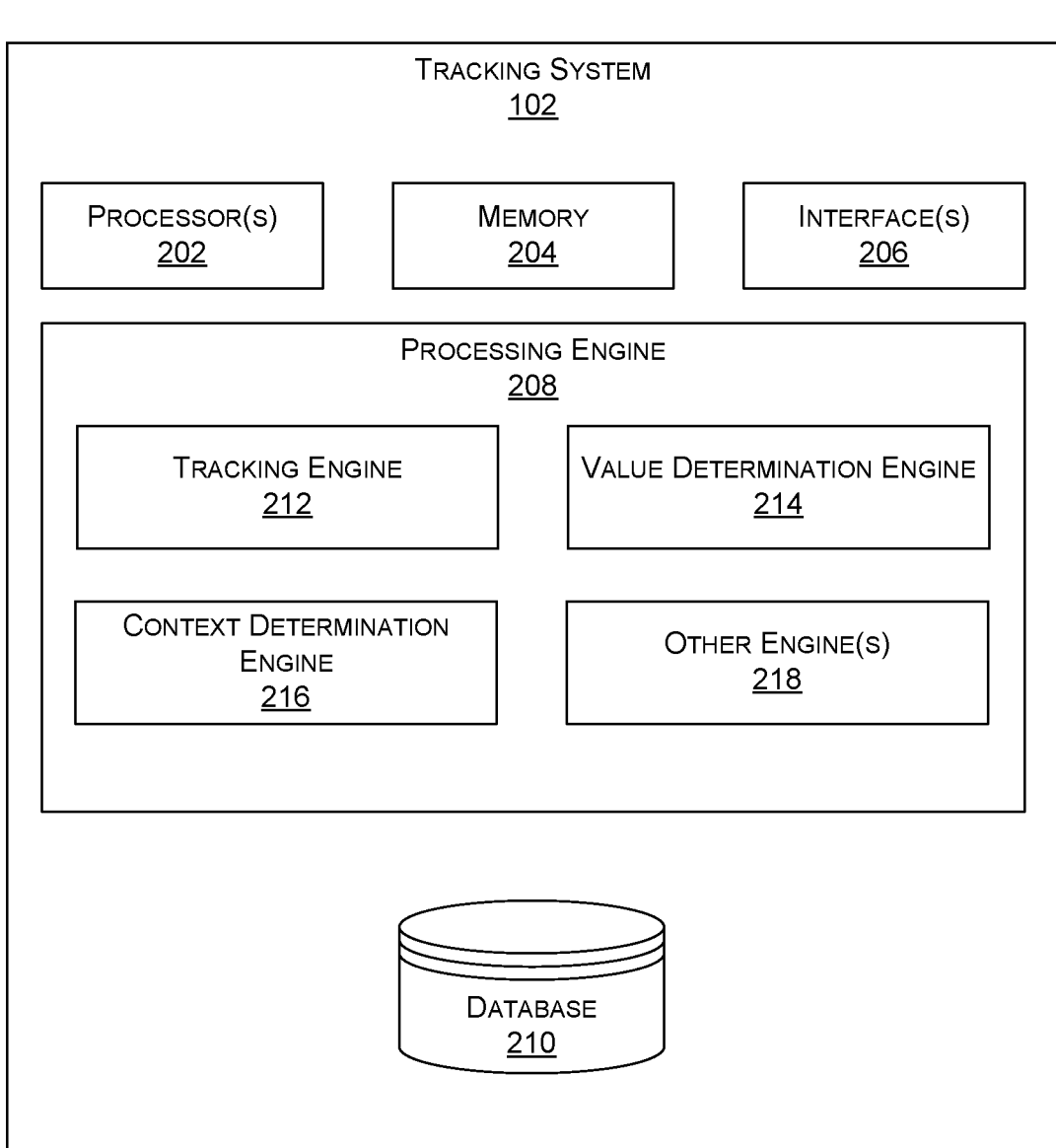
FIG. 2 illustrates an exemplary block diagram (200) of a tracking system (102), in accordance with an embodiment of the present disclosure.

In an example, the tracking system (102) may include a cloud solution backend, where assignment and tracking of objects (106) in transit may be performed via the one or more label units (110). The backend may include the one or more communication engines to communicate with the one or more label units (110), and a business engine for tracking and tracing the one or more label units (110). The tracking system (102) may include a database (210) (as shown in FIG. 2) that stores the required tracking data associated with the objects (106) in transit. The tracking system (102) may include an application programming interface (API) engine to consume the generated information and a presentation engine for visual representation of the data, including, but not limited to, via portal, mobile application, and the like.

In an embodiment, the tracking system (102) may be configured to receive the one or more tracking data from each of the one or more label units (110) via a first set of signals.

In an embodiment, the tracking system (102) may determine the state-of-charge value of the power supply unit (118) based on the one or more tracking data of the corresponding label unit (110). In some embodiments, the tracking system (102) may determine the state-of-charge value of the corresponding label unit (110) by retrieving one or more specifications associated with the label unit (110) or the power supply unit (118) thereof from the database (210). In such embodiments, the state-of-charge value of the label unit (110) may be indicative of the capacity of said power supply unit (118) during installation. In other embodiments, the tracking system (102) may determine the state-of-charge value based on the one or more tracking data. In such embodiments, the one or more tracking data may include capacity of the power supply unit (118) during installation, power discharge trend, historical discharge rate of the power supply unit (118), and the like. The tracking system (102) may be configured to dynamically update the state-of-charge value of the power supply unit (118) based on performance thereof. In an example, the tracking system (102) may determine the rate of discharge of the power supply unit (118) during transit, and predict the state-of-charge value of said power supply unit (118) therewith. In another example, the tracking system (102) may analyse the historical discharge rates of the power supply unit (118) to determine the state-of-charge value.

In embodiments where the state-of-charge value is less than a transit duration value associated with the object (106) in transit, the tracking system (102) may determine one or more contextual transit parameters associated with said object (106). In an embodiment, the transit duration value may be indicative of the length of time the object (106) is expected to be in transit. In an example, the object (106) may be placed in a transit container truck for shipping between a first geographical location to a second geographical location. In such examples, the transit duration value may be the length of time required for loading the object (106) into the container truck, transporting the container truck from the first geographical location to the second geographical location, and unloading said object (106) therefrom. The tracking system (102) may be configured to determine and compare the transit duration value with the state-of-charge value of the power supply unit (118) to determine whether the label unit (110) may be able to collect and transmit the tracking data to said tracking system (102) throughout the duration of transit.

The one or more contextual transit parameters may include, but not be limited to, a route type parameter, a transit type parameter, an object type parameter, a consignor and consignee parameter, and the one or more tracking data of the other label units (110) from the one or more label units (110) sharing a transit container, and the like. The route type parameter may correspond to whether the transit is by air, water, or land (by rail or by road). The transit type parameter may correspond to whether the object (106) in transit is normal or priority, and if said object (106) is insured. The object type parameter may correspond to whether the object (106) in transit is normal, delicate, or fragile. The consignor and consignee parameter may correspond to whether the object (106) belongs to any one of an ordinally related set of classes. Such contextual transit parameters may be assigned to the object (106) during or before the transit. The one or more contextual transit parameters may also include the one or more tracking data from each of the one or more label units (110) sharing the transit container.

Having the tracking data of other label units (110) in the transit container may allow the object (106) to be tracked even when the power supply unit (118) associated therewith has been discharged. The transit container may include, but not be limited to, ships, trucks, vans, trains, cargo flights, and the like. In some embodiments, the tracking system (102) may use the tracking data from other label units (110) to infer including, but not limited to, transit route, live transit position, and the like, of the one or more label units (110). In an example, the tracking system (102) may infer the tracking data of the first label unit (110-1) being shipped on a transit container indicative of truck from City A to City B, by receiving the tracking data associated with other label units (110) in said transit container.

In some embodiments, to optimize the energy consumption of the one or more label units (110), the tracking system (102) may be configured to determine an alternate transit route for the object (106) based on the one or more contextual transit parameters and the state-of-charge of the power supply unit (118). In an example, tracking system (102) may determine and recommend a route type parameter indicative of air transit when the transit type parameter of the object (106) is priority. In such examples, the tracking system (102) may also determine an alternate transit route for the object (106) to ensure the power supply unit (118) supplies power to the corresponding label unit (110) until said object (106) is delivered to the destination. The tracking system (102) may be configured to determine the alternate route such that the time duration value of the alternate route may be equal to or less than the state-of-charge value of the power supply unit (118).

In an embodiment, the tracking system (102) may transmit a second set of signals to the one or more label units (110) to optimize energy consumption thereof based on the one or more contextual transit parameters. In some embodiments, on receiving the second set of signals, the one or more label units (110) may conserve energy by reducing ping frequency of communication between said one or more label units (110) and the tracking system (102). In such embodiments, the one or more label units (110) may intermittently communicate with the tracking system (102)

In other embodiments, the one or more label units (110) may optimize frequency at which the one or more sensors (116) collect the one or more tracking data. In such embodiments, the one or more sensors (116) may periodically collect the one or more tracking data such that the tracking system (102) may be able to impute or infer the one or more tracking data therefrom.

In yet other embodiments, the one or more label units (110) may periodically enter into sleep mode. In such embodiments, the one or more label units (110) may periodically shut down operations, thereby ceasing energy consumption. The one or more label units (110) may then wake up to resume operations to collect the one or more tracking data and communication with the tracking system (102) for a predetermined period of time, and may re-enter into sleep mode to conserve energy thereafter. In such embodiments, the one or more label units (110) may provide the tracking data periodically to the tracking system (102). The tracking system (102) may receive the tracking data periodically, and impute the tracking data during the period when the one or more label units (110) enter into sleep mode. The frequency at which the one or more label units (110) may wake up, and collect and transmit the tracking data may be dynamically determined based on accuracy requirements, and the state-of-charge value of the power supply unit (118).

In other embodiments, the one or more label units (110) may be configured to dynamically adjust one or more performance configurations of the one or more label units (110) to conserve energy. In an example, the one or more label units (110) may reduce brightness of the audio-visual unit (114) to conserve energy. In other examples, the one or more label units (110) may downgrade from a 4G network to a 3G network for communicating with the tracking system (102). In such examples, the one or more label units (110) may also dynamically switch between the communication networks based on availability of said communication networks in one or more portions of the transit route of the corresponding object (106). In other examples, the one or more label units (110) may be configured to stop and resume operations of the communication unit (112) when the object (106) passes through regions of the transit route with minimal network connectivity.

In some embodiments, the object (106) in transit may be associated with the transit container. In some embodiments, the transit container may have an intermediate communication unit (not shown). The intermediate communication unit may be any one or combination of including, but not limited to, Bluetooth, a Zigbee, an NFC, a Wi-Fi network, a Li-FI network, a carrier network including a circuit-switched network, a packet switched network, a PSTN, a CDN network, an Internet, intranets, LANs, WANs, and the like. In some embodiments, when the transit duration value is greater than the state-of-charge value of the power supply unit (118), the one or more label units (110) may be configured to transmit the one or more tracking data to the tracking system (102) via the intermediate communication unit to reduce energy consumption thereof. In such embodiments, energy required to communicate with the intermediate communication unit may be less that the energy required to communicate with the tracking system (102). The intermediate communication unit may relay the one or more tracking data received from the one or more label units (110) to the tracking system (102), thereby reducing energy consumption of said one or more label units (110).

In some embodiments, the one or more label units (110) and the tracking system (102) may be configured to dynamically update the transit duration value and the state-of-charge value during the transit based on the one or more tracking data. In an example where the transit route of the object (106) via a road is altered due to a road block, the one or more label units (110) may transmit the deviations in transit route to the tracking system (102) via the one or more tracking data. The tracking system (102), based on the deviation, may transmit the second set of signals to reduce the ping frequency of communication with the one or more label units (110) to reduce energy consumption thereof during transit through the altered route.

The system (100), by optimizing energy consumption of the one or more label units (110), may allow the tracking data associated with the corresponding object (106) to be collected without interruption. The system (100) may also may determine and utilize the one or more contextual transit parameters for continued collection of the one or more tracking data with minimal degradation in volume, variety, and velocity of said data, thereby providing accurate end-to-end tracking of the objects (106). In some implementations of the system (100), said system (100) may be able to provide seamless package tracking experience to customer from source to destination irrespective of the distance and duration therebetween.

FIG. 2 illustrates an exemplary block diagram (200) of the tracking system (102), in accordance with an embodiment of the present disclosure.

In an embodiment, the tracking system (102) may include one or more processors (202) coupled with a memory (204), where the memory (204) may store instructions which when executed by the one or more processors (202) may cause the system (102) to track the one or more label units (110). In an aspect, the tracking system (102) may include one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processors (202) may be configured to fetch and execute computer-readable instructions stored in a memory (204) of the tracking system (102). The memory (204) may be configured to store one or more computer-readable instructions or routines in a non-transitory computer readable storage medium, which may be fetched and executed to create or share data packets over a network service. The memory (204) may include any non-transitory storage device including, for example, volatile memory such as Random Access Memory (RAM), or non-volatile memory such as Erasable Programmable Read-Only Memory (EPROM), flash memory, and the like.

In an embodiment, the tracking system (102) may include an interface(s) (206). The interface(s) (206) may include a variety of interfaces, for example, interfaces for data input and output devices, referred to as I/O devices, storage devices, and the like. The interface(s) (206) may facilitate communication with the tracking system (102). The interface(s) (206) may also provide a communication pathway for one or more components of the tracking system (102). Examples of such components include, but are not limited to, processing engine(s) (208) and a database (210).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may include a processing resource (for example, one or more processors), to execute such instructions. In the present examples, the machine-readable storage medium may store instructions that, when executed by the processing resource, implement the processing engine(s) (208). In such examples, the tracking system (102) may include the machine-readable storage medium storing the instructions and the processing resource to execute the instructions, or the machine-readable storage medium may be separate but accessible to the tracking system (102) and the processing resource. In other examples, the processing engine(s) (208) may be implemented by electronic circuitry.

The processing engine (208) may include one or more engines selected from any of a tracking engine (212), a value determination engine (214), a context determination engine (216), and other engines (218). In an embodiment, the other engines (218) may include the communication engine, the business engine, the API engine, and the presentation engine.

In an embodiment, the tracking engine (212) may be configured to receive the one or more tracking and monitoring data from the one or more label units (110) via the first set of signals. In an embodiment, the tracking engine (212) may be used for analyzing the location, health, movement data, but not limited thereto, of the objects (106) in transit in real-time. In an embodiment, the tracking engine (212) may also provide a dashboard for analysis of said data.

In an embodiment, the value determination engine (214) may determine the state-of-charge value of the power supply unit (118) based on the one or more tracking data of the corresponding label unit (110). In some embodiments, the value determination engine (214) may determine the state-of-charge value based on the specifications of the power supply unit (118) during installation into the one or more label units (110). In other embodiments, the value determination engine (214) may be configured to determine the state-of-charge value based on the one or more tracking data. In an example, the state-of-charge value may be determined based on the rate of discharge of the power supply unit (118) during the immediately preceding transit.

In an embodiment, the context determination engine (216) may be configured to determine one or more contextual transit parameters associated with the object (106) when the state-of-charge value is less than a transit duration value associated with said object (106) in transit. The one or more contextual transit parameters may be determined based on the one or more tracking data. The context determination engine (216) may be configured to transmit a second set of signals to the one or more label units (110) to optimize energy consumption thereof based on the one or more contextual transit parameters.

In an aspect, a user equipment (UE) may include one or more processors, and a memory operatively coupled to the one or more processors, where the memory may include processor-executable instructions, which on execution, cause the one or more processors to transmit a fifth set of signals to the tracking system (102) requesting one or more tracking data of the object (106) in transit collected by a label unit (110) attached thereto, where the label unit (110) optimizes energy consumption based on a state-of-charge value of the power supply unit (118) thereof, and a transit duration value determined using one or more contextual transit parameters. The one or more processors of the UE may receive a sixth set of signals from the tracking system (102), said sixth set of signals having the requested one or more tracking data.

In an aspect, the present disclosure relates to a non-transitory computer-readable medium may include processor-executable instructions that implement the system and the method of the present disclosure.

FIG. 3 illustrates an exemplary representation (300) of the conductive strips (120) associated with the first label unit (110-1) and the second label unit (110-2), in accordance with an embodiment of the present disclosure.

As illustrated in FIG. 3, the first label unit (110-1) may have a first audio-visual unit (114-1), a first set of sensors (116-1), a first power supply unit (118-1), a first connector interface (122-1), and a first adhesive portion (126-1) associated thereto, on a first conductive strip (120-1). The first label unit (110-1) may be attached to the object (106) and a transit duration value may be provided thereto. Further, the second label unit (110-2) may have a second audio-visual unit (114-2), a second set of sensors (116-2), a second power supply unit (118-2), a second connector interface (122-2), and a second adhesive portion (126-2) associated thereto, on a second conductive strip (120-2).

In an embodiment, the first label unit (110-1) may have the first application engine (124-1) associated therewith, which may determine whether the state-of-charge value of the first power supply unit (118-1) is less than the transit duration value of the object (106).

In some embodiments, if the state-of-charge value is less than the transit duration value, the first label unit (110-1) may display a warning message indicating the same on the first audio-visual unit (114-1). The first label unit (110-1) may also transmit the third set of signals to the tracking system (102) indicating the need for replacement. The third set of signals may include the warning message. On viewing the warning message either on the first audio-visual unit (114-1) or the tracking system (102), the operator of the system (100) may replace the first label unit (110-1) with the second label unit (110-2). In such embodiments, the second power supply unit (118-2) of the second label unit (110-2) may have the state-of-charge value greater than or equal to the transit duration value. Further, in such embodiments, the subscriber identifier attribute of the first label unit (110-1) may be transferred to the second label unit (110-2). In some embodiments, when the connector interface (122-2) of the second label unit (110-2) may be aligned with the connector interface (122-1) of the first label unit (110-1), said first label unit (110-1) may transmit the subscriber identifier attribute to the second label unit (110-2) via the 2-way encrypted communication channel therebetween. The second label unit (110-2) may then transmit a set of transfer signals to the tracking system (102) to update the database (210) via the network (104), such that the tracking system (102) associates the one or more tracking data collected by the second label unit (110-2) with the object (106) in transit. In other examples, the operators of the system (100) may replace the first power supply unit (118-1) with the second power supply unit (118-2) having state-of-charge value greater than or equivalent to the transit duration value.

In other embodiments, the tracking system (102) may be configured to transmit the second set of signals to cause the first label unit (110-1) to optimize energy consumption thereof. The tracking system (102) may recommend one or more energy optimization strategies based on the one or more contextual transit parameters determined from the one or more tracking data. In some examples, the tracking system (102) may generate an alternate route for the object (106) such that the transit duration value is reduced to be made equal to or less than the state-of-charge value of the first power supply unit (118-1). In such examples, the alternate route may be displayed on the first audio-visual unit (114-1) to allow operators to appropriately place the object (106) in the transit container following said alternate route. In other examples, the tracking system (102) may cause the first label unit (110-1) to provide the one or more tracking data at a predetermined interval instead of in real-time to conserve energy. If, in such examples, the route of the object (106) in transit is altered, the tracking system (102) may use the contextual transit parameters indicative of the tracking data from the second label unit (110-2) attached to another object (106) in transit in the same transit container as the first label unit (110-1) to detect the alteration in route, and dynamically cause the first label unit (110-1) to further reduce the frequency at which the one or more tracking data is transmitted to the tracking system (102).

FIG. 4 illustrates a flowchart of an example method (400) for contextual tracking of label units (110) and optimizing energy consumption thereof, in accordance with an embodiment of the present disclosure.

At step (402), the method (400) may include configuring a label unit (110) from one or more label units (110) to a corresponding object (106) from one or more objects in transit. Each of the one or more label units (110) have one or more sensors (116) that collect one or more tracking data associated with the object (106), and each of the label units (110) are powered by a corresponding power supply unit (118).

At step (404), the method (400) may include receiving, by a tracking system (102), the one or more tracking data from each of the one or more label units (110) via a first set of signals.

At step (406), the method (400) may include determining, by the tracking system (102), a state-of-charge value of the power supply unit (118) based on the one or more tracking data of the corresponding label unit (110).

At step (408), the method (400) may include determining, by the tracking system (102), one or more contextual transit parameters associated with said object (106), when the state-of-charge value is less than a transit duration value associated with the object (106) in transit.

At step (410), the method (400) may include transmitting, by the tracking system (102), a second set of signals to the one or more label units (110) to optimize energy consumption thereof based on the one or more contextual transit parameters.

Figure 5:
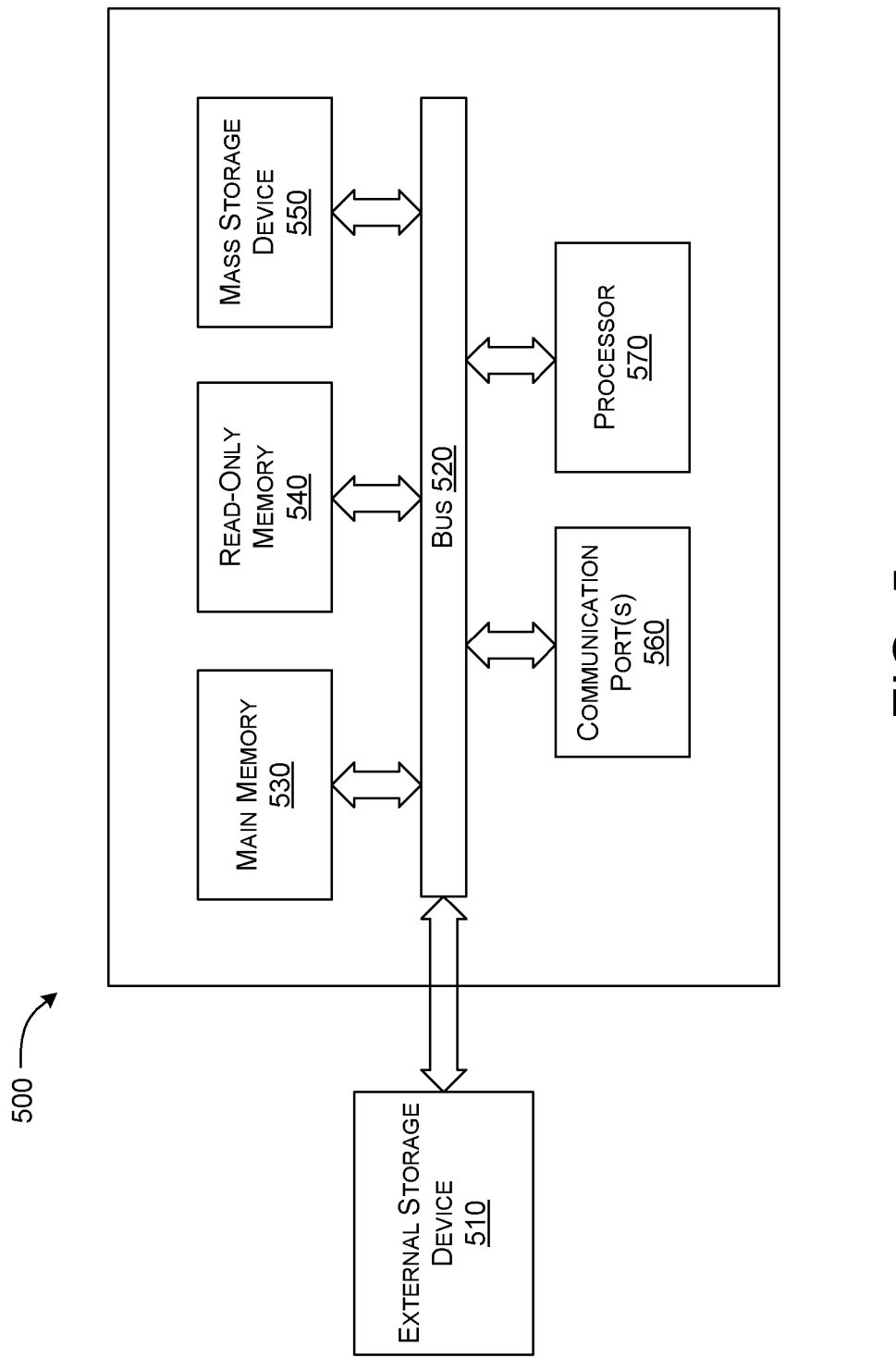
FIG. 5 illustrates an exemplary computer system (500) in which or with which embodiments of the present disclosure may be utilized in accordance with embodiments of the present disclosure.

FIG. 5 illustrates an exemplary computer system (500) in which or with which embodiments of the present disclosure may be utilized in accordance with embodiments of the present disclosure.

As shown in FIG. 5, the computer system (500) may include an external storage device (510), a bus (520), a main memory (530), a read only memory (540), a mass storage device (550), communication port (560), and a processor (570). A person skilled in the art will appreciate that the computer system (500) may include more than one processor and communication ports. The processor (570) may include various modules associated with embodiments of the present disclosure. The communication port (560) may be any of an RS-242 port for use with a modem-based dialup connection, a 6/60 Ethernet port, a Gigabit or 6 Gigabit port using copper or fiber, a serial port, a parallel port, or other existing or future ports. The communication port (560) may be chosen depending on a network, such a Local Area Network (LAN), Wide Area Network (WAN), or any network to which computer system connects. The memory (530) may be Random Access Memory (RAM), or any other dynamic storage device commonly known in the art. The read-only memory (530) may be any static storage device(s) e.g., but not limited to, a Programmable Read Only Memory (PROM) chips for storing static information. The mass storage (550) may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

The bus (520) may communicatively couple the processor(s) (570) with the other memory, storage, and communication blocks. The bus (520) may be, e.g., a Peripheral Component Interconnect (PCI)/PCI Extended (PCI-X) bus, Small Computer System Interface (SCSI), USB, or the like, for connecting expansion cards, drives and other subsystems as well as other buses, such a front side bus (FSB), which connects the processor (570) to the computer system (500).

Optionally, operator and administrative interfaces, e.g., a display, keyboard, and a cursor control device, may also be coupled to the bus (520) to support direct operator interaction with the computer system (500). Other operator and administrative interfaces may be provided through network connections connected through the communication port (560). The external storage device (510) may be any kind of external hard-drives, floppy drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system (500) limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides a system and a method for contextual tracking of label units and optimizing energy consumption thereof.

The present disclosure provides a system and a method for tracking label units based on contextual information including, but not limited to, destination location, transit duration, power discharge trend, cloud feedback on power discharge trends, re-routing or route deviation, etc. along with remaining charge of power supply units.

The present disclosure provides a system and a method for optimizing energy consumption of label units to extend capacity of power supply units thereof.

The present disclosure provides a system and a method for tracking packages from source to destination irrespective of the distance and duration, and provide seamless package tracking experience to customer(s).

The present disclosure provides a system and a method that allows for accurate end-to-end tracking of packages using the label units without any kind of technical hinderance.

The present disclosure provides a system and a method for tracking label units that is simple, cost effective, and consumes less power, thereby being environmentally friendly.

We claim:

1. A system for contextual tracking of label units and optimizing energy consumption thereof, the system comprising:

one or more label units with each label unit being attached to a corresponding object from one or more objects in transit, each of the one or more label units having one or more sensors that collect one or more tracking data associated with the object, and each of the one or more label units being powered by a corresponding power supply unit;

a tracking system having one or more processors coupled to a memory, the memory having one or more processor-executable instructions, which when executed, cause the one or more processors to:

receive the one or more tracking data from each of the one or more label units via a first set of signals;

determine a state-of-charge value of the power supply unit based on the one or more tracking data of the corresponding label unit;

determine one or more contextual transit parameters associated with said object based on the state-of-charge value being less than a transit duration value associated with the object in transit, wherein when a first state-of-charge value associated with a first label unit from the one or more label units is less than the transit duration value of the object associated therewith, the first label unit is configured to transmit a third set of signals to the tracking system for replacing said first label unit with a second label unit having a second state-of-charge value greater than the transit duration value, and wherein on said replacement, a first application engine associated with the first label unit and a second application engine of the second label unit establish a 2-way encrypted communication channel therebetween via corresponding connector interfaces; and transmit a second set of signals to the one or more label units to optimize the energy consumption thereof based on the one or more contextual transit parameters, wherein in response to receiving the second set of signals, the one or more label units are configured to conserve energy by a combination of:

reducing ping frequency of communication between said one or more label units and the tracking system;

optimizing frequency at which the one or more sensors collect the one or more tracking data;

periodically entering into sleep mode; and dynamically adjusting one or more performance configurations of the one or more label units to conserve the energy, thereby extending operational lifespan of the power supply unit and ensuring continuous tracking of the object in transit despite battery constraints.

2. The system as claimed in claim 1, wherein the one or more contextual transit parameters are any one or combination of: a route type parameter, a transit type parameter, an object type parameter, a consignor and consignee parameter, and the one or more tracking data of the one or more label units sharing a transit container.

3. The system as claimed in claim 1, wherein to optimize the energy consumption of the one or more label units, the one or more processors are configured to determine an alternate transit route for the object based on the one or more contextual transit parameters and the state-of-charge of the power supply unit.

4. The system as claimed in claim 1, wherein the object in transit is associated with a transit container having an intermediate communication unit, and wherein when the transit duration value is greater than the state-of-charge value of the power supply unit, the one or more label units are configured to transmit the one or more tracking data to the tracking system via the intermediate communication unit.

5. The system as claimed in claim 1, wherein each of the one or more label units comprises an audio-visual unit to provide any one or combination of audio and visual indications to an operator of the system for replacing the first label unit attached to the object with the second label unit.

6. The system as claimed in claim 1, wherein the first label unit comprises a subscriber identifier attribute indicative of a Mobile Station International Subscriber Directory Number (MSISDN) number associated with a Subscriber Identity Module (SIM) thereof, the subscriber identifier attribute being transferred from the first label unit to the second label unit on replacement.

7. The system as claimed in claim 1, wherein each of the one or more label units comprise:

a communication unit for transmitting to and receiving data from the tracking system; and a conductive strip with which said label unit is secured to the corresponding object, the conductive strip having a connector interface that enables communication with other label units and transmit a fourth set of signals therebetween.

8. A method for contextual tracking of label units and optimizing energy consumption thereof, the method comprising:

configuring a label unit from one or more label units to a corresponding object from one or more objects in transit, each of the one or more label units having one or more sensors that collect one or more tracking data associated with the object, and each of the one or more label units being powered by a corresponding power supply unit;

receiving, by a tracking system, the one or more tracking data from each of the one or more label units via a first set of signals;

determining, by the tracking system, a state-of-charge value of the power supply unit based on the one or more tracking data of the corresponding label unit;

determining, by the tracking system, one or more contextual transit parameters associated with said object based on the state-of-charge value being less than a transit duration value associated with the object in transit, wherein when a first state-of-charge value associated with a first label unit from the one or more label units is less than the transit duration value of the object associated therewith, the first label unit transmits a third set of signals to the tracking system for replacing said first label unit with a second label unit having a second state-of-charge value greater than the transit duration value, and wherein on said replacement, a first application engine associated with the first label unit and a second application engine of the second label unit establish a 2-way encrypted communication channel therebetween via corresponding connector interfaces; and transmitting, by the tracking system, a second set of signals to the one or more label units to optimize energy consumption thereof based on the one or more contextual transit parameters, wherein in response to receiving the second set of signals, the method comprises conserving energy by a combination of:

reducing ping frequency of communication between said one or more label units and the tracking system;

optimizing frequency at which the one or more sensors collect the one or more tracking data;

periodically entering into sleep mode; and dynamically adjusting one or more performance configurations of the one or more label units to conserve the energy, thereby extending operational lifespan of the power supply unit and ensuring continuous tracking of the object in transit despite battery constraints.

9. The method as claimed in claim 8, wherein to optimize the energy consumption of the one or more label units, the method comprises determining, by the tracking system, an alternate transit route for the object based on the one or more contextual transit parameters and the state-of-charge of the power supply unit.

10. The method as claimed in claim 8, wherein the object in transit is associated with a transit container having an intermediate communication unit, and wherein when the transit duration value is greater than the state-of-charge value of the power supply unit, the method comprises transmitting, by the one or more label units, the one or more tracking data to the tracking system via the intermediate communication unit.

11. The method as claimed in claim 8, wherein the method comprises providing, by an audio-visual unit associated with the first label unit, any one or combination of audio and visual indications to an operator for replacing the first label unit attached to the object with the second label unit.

12. A user equipment, comprising:

one or more processors; and a memory operatively coupled to the one or more processors, the memory comprises processor-executable instructions, which on execution, cause the one or more processors to:

transmit a set of signals to a tracking system requesting one or more tracking data of an object in transit collected by a label unit attached thereto, wherein the label unit has one or more sensors that collect the one or more tracking data associated with the object, wherein the label unit optimizes energy consumption based on a state-of-charge value of a power supply unit thereof, and a transit duration value determined using one or more contextual transit parameters, wherein when a first state-of-charge value associated with a first label unit from one or more label units is less than the transit duration value of the object associated therewith, the first label unit transmits the set of signals to the tracking system for replacing said first label unit with a second label unit having a second state-of-charge value greater than the transit duration value, and wherein on said replacement, a first application engine associated with the first label unit and a second application engine of the second label unit establish a 2-way encrypted communication channel therebetween via corresponding connector interfaces; and receive the set of signals from the tracking system, said set of signals having the requested one or more tracking data, wherein in response to receiving the set of signals, the label unit is configured to conserve energy by a combination of:

reducing ping frequency of communication between said label unit and the tracking system;

optimizing frequency at which the one or more sensors collect the one or more tracking data;

periodically entering into sleep mode; and dynamically adjusting one or more performance configurations of the label unit to conserve the energy, thereby extending operational lifespan of the power supply unit and ensuring continuous tracking of the object in transit despite battery constraints.

* * * * *